UNITED STATES PATENT OFFICE.

MILO L. DOTY, OF WINTERSET, ASSIGNOR TO THOMAS G. ORWIG AND H. D. DOTY, OF DES MOINES, IOWA.

IMPROVEMENT IN PROCESSES FOR TANNING.

Specification forming part of Letters Patent No. 221,219, dated November 4, 1879; application filed April 29, 1878.

*To all whom it may concern:*

Be it known that I, MILO L. DOTY, of Winterset, in the county of Madison and State of Iowa, have invented an Improved Method of Tanning Leather, of which the following is a specification.

The object of my invention is to save time, labor, and material in applying tannin to animal hides to produce leather, and to improve the quality of the leather made by means of tanning substances.

Heretofore the skins of animals, after being salted, steeped in milk of lime, and the hair and flesh taken off, have been immersed in liquid containing ground bark and tannin extracts to transform them into leather, and allowed to remain therein frequently as long as six months at a time, to become impregnated with the tannin and astringent matter contained in the liquor.

Various means of handling the hides and stirring the liquid to facilitate chemical action of the tanning properties contained in the liquor have been used. Bran has also been used upon the flesh sides of hides while they were immersed to absorb the diluted tannin and to conduct it to the hides. Fermentative matter has also been applied to hides to aid the action of the tannin, and hides have been hung up and sweated and steamed.

My method of treating a hide in the process of tanning, after it has been prepared by liming and bating for the reception of the tannin that is required to shrink the fiber and to produce compact leather, consists in applying soluble tannin to a hide through the medium of a paste that is adapted to retain liquid tannin on the surface of the hide until it is absorbed by the hide while the hide is exposed to the action of a drying atmosphere; and I accomplish this result by simply adding to the extract of bark in liquid form sufficient flour made of wheat or other small grain and other suitable matter for making an adhesive paste, and applying the same on both sides of the hides with a brush, by dipping or in any suitable way, to completely cover the hide, and then hanging up the hide in a place adapted for drying by the action of warm and dry air.

The tannin contained in the paste is rapidly absorbed by the moist and porous hide, and lodged therein to shrink the fibrine by its astringent qualities, to expel water and matter that was decomposed by the action of the milk of lime, and to preserve in a compact pliable body all the valuable properties of the hide that remain to produce leather.

The liquid tannin used in making the paste may vary in its chemical strength to suit different kinds of hides and to produce different kinds of leather. The extracts of the various kinds of barks—oak, hemlock, &c.—and of other vegetable matter, such as sumac, smartweed, &c., are preferred; but any soluble tannin, vegetable or mineral, may be advantageously applied to hides by my method for the purpose of tanning them and converting them into leather.

As soon as the paste on a suspended hide becomes nearly dry I treat it with another coat of paste containing tannin, or moisten it with liquid tannin, and thus use the paste as a medium of conveying tannin to the hide until it is thoroughly tanned.

The number of applications of paste and liquid tannin, and the intervals of time between the applications, may vary in accordance with the quality of the tannin used and the kind of leather to be made. Under favorable circumstances good calf-skin leather may be thus tanned in ten days.

To one gallon of the merchantable extract of bark, after it is reduced to a proper strength by diluting it with water, I add about one pound of salt, preferably after it is made into a brine, and then thicken the liquid with flour, or what is known as "shorts," to produce an adhesive paste that is adapted to cover a hide. Any quantity of paste can be thus readily prepared by using similar ingredients in about the same proportions, and any antiseptic or astringent soluble substance can be introduced into the compound to aid in making leather by my method of applying tannin to hides through the medium of an adhesive paste and the chemical action of a drying atmosphere.

By means of this method of applying tannin and subjecting hides to its action while in a drying atmosphere a better quality of leather is produced, with much less labor and expense and in much less time, than by the old method of immersing the hides in tannic liquors and allowing them to remain buried therein, and thereby deprived from the chemical action of dry air.

I am aware that emulsive compounds made of wheat-flour, alum, salt, potatoes, yolks of eggs, and milk have been applied like paste to the skins of animals for the purpose of tanning and dressing the skins, but not for the purpose of applying tannin and making leather. I therefore do not claim that covering a hide with adhesive paste is novel; but I do claim that my method of producing leather from animal hides by applying tannin to a hide through the medium of an adhesive paste and the chemical action of a drying atmosphere in sufficient quantities to make good sole-leather, harness-leather, kip, and calf-skins and moroccos is new and greatly advantageous, in that a better quality of leather can be made thereby in less time and with less expense than by any other known method of tanning hides.

After hides are tanned by my method they can be readily stuffed and finished in any style desired by a practical finisher.

What I claim, and desire to secure by Letters Patent of the United States, is—

1. An adhesive paste composed of ground grain, a solution of tannin, and salt, substantially as and for the purposes set forth.

2. In the art of tanning, as distinguished from tawing, the following method of producing leather, to wit: Covering a prepared hide with adhesive paste composed of ground grain, a solution of tannin and salt, and then suspending the hide in a drying atmosphere, and keeping the paste moist with liquid tannin until the astringent properties of the tannin and the natural action of the atmosphere co-act in shrinking the fibrine of the hide, and thereby producing compact and well-tanned leather.

3. In the art of making leather from animal hides, the hereinbefore-described mode or process, which consists, essentially, in covering a hide with an adhesive paste, and then suspending it in a suitable warm and dry air, and keeping the paste moist by successive applications of a solution of tannin until the hide has absorbed a sufficient quantity of tannin to transform it into leather.

MILO L. DOTY.

Witnesses:
ERASTUS W. SMITH,
FRANK W. HEERS.